(12) United States Patent
Eggert

(10) Patent No.: US 9,943,934 B2
(45) Date of Patent: Apr. 17, 2018

(54) METHOD AND TOOL PRODUCT OF DIFFERENTIAL HEAT TREATMENT PROCESS

(75) Inventor: Daniel M. Eggert, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 951 days.

(21) Appl. No.: 12/247,932

(22) Filed: Oct. 8, 2008

(65) Prior Publication Data

US 2010/0083795 A1    Apr. 8, 2010

(51) Int. Cl.
| C21D 9/00 | (2006.01) |
| B23P 15/00 | (2006.01) |
| B25B 13/00 | (2006.01) |
| B25B 15/00 | (2006.01) |
| B25B 23/00 | (2006.01) |
| C21D 1/18 | (2006.01) |

(52) U.S. Cl.
CPC .............. *B23P 15/00* (2013.01); *B25B 13/00* (2013.01); *B25B 15/002* (2013.01); *B25B 23/0021* (2013.01); *C21D 1/18* (2013.01); *C21D 9/0068* (2013.01); *C21D 2211/008* (2013.01); *Y10T 29/49* (2015.01)

(58) Field of Classification Search
CPC ............ C21D 1/18; B23P 15/00; B23B 13/00
USPC ................................ 148/559; 29/592; 81/52
See application file for complete search history.

(56) References Cited

U.S. PATENT DOCUMENTS

| 405,827 | A | | 6/1889 | Button | |
| 1,794,445 | A | | 3/1931 | Davis | |
| RE18,661 | E | | 11/1932 | Davis | |
| 2,229,565 | A | * | 1/1941 | Hallowell, Jr. | ............... 411/403 |
| 2,462,072 | A | | 2/1949 | Darmara | |
| 2,936,010 | A | * | 5/1960 | Ansingh | .......... 81/436 |
| 3,190,380 | A | * | 6/1965 | Anderson | ............. 175/420.1 |
| 4,027,274 | A | | 5/1977 | Chadwick | |
| 4,099,585 | A | * | 7/1978 | Emmerich | ............. 175/320 |
| 5,803,993 | A | * | 9/1998 | Yoshida et al. | ............... 148/320 |
| 6,030,471 | A | | 2/2000 | Coles et al. | |
| 6,086,305 | A | | 7/2000 | Lat et al. | |
| 6,109,851 | A | | 8/2000 | Bauer et al. | |
| 6,187,118 | B1 | | 2/2001 | Nierlich | |
| 6,273,974 | B1 | | 8/2001 | Lat et al. | |
| 6,364,972 | B1 | | 4/2002 | Bauer et al. | |
| 7,247,099 | B2 | | 7/2007 | Friedrich et al. | |
| 2004/0129355 | A1 | | 7/2004 | Hower et al. | |
| 2008/0083207 | A1 | | 4/2008 | Jordan | |

* cited by examiner

*Primary Examiner* — Jie Yang
(74) *Attorney, Agent, or Firm* — Seyfarth Shaw LLP

(57) ABSTRACT

A tool having a relatively ductile working end for engaging workpieces and a relatively hard non-working portion for driving the tool is disclosed, and a process for making same. The tool is formed with the material in a first state, such as by cold-working, and then only the non-working portion is heat treated to a second state. The working end is thus maintained in the ductile state while the non-working portion is hardened, thus imparting different materials performance characteristics to working end and non-working portion.

7 Claims, 2 Drawing Sheets

METHOD AND TOOL PRODUCT OF DIFFERENTIAL HEAT TREATMENT PROCESS

FIELD OF THE INVENTION

The invention relates to heat treatment for tools and, in particular, to heat treatment providing the tools with at least two regions of differentially applied heat treatment and corresponding materials performance characteristics.

BACKGROUND

Currently, it is well known to provide heat treatment to metal implements such as handtools, vehicle parts, factory machinery, or any other metal product for which strength, wear, cyclic life, impact, or other materials characteristics determine the performance of the implement in its intended or expected usage. Virtually all metal products are made from an alloy or mix of elemental materials, the alloy typically having a dominant metal such as iron or aluminum that also is the dominant factor in the resulting performance characteristics of the alloy and any product made therefrom.

As examples, it is common to fashion a variety of handtools for driving or removing workpieces such as screws, nuts, bolts, and the like, these handtools commonly known as wrenches and socket driver sets, referred to herein collectively simply as drivers. Within the range of both intended usage and unintended though expected usage for such handtools are a need for a user to apply high torques through an elongated member including torque overloads, a need for a close fit with a workpiece for transmitting torque thereto, an expectation of high cyclic life before failure both in terms of wear and in terms of fracture, and an expectation of high impact life both in terms of cyclic impact life and single-event impacts. To be clearer, a user assumes that a tool will perform as intended with repeated application of torque, that contact surfaces have a high resistance to wear, and that the user will be able to mistreat the tool at times, such as by dropping or overtorquing the tool, or even using it as a hammer, as mere examples.

The important factors for providing a driver handtool as described are the material composition, the steps taken to form the tool, the actual shape of the tool considering stress concentrators, for instance, and the heat treatment. The most common material for drivers is a steel alloy of iron, carbon, and relatively small amounts of other metals. Formation of the tool in part or in whole may be by any method or methods, such as forging, casting, stamping, or rolling, etc., and generally includes some stage of cold-working in order to shape a working end for engaging a workpiece. More specifically and as an example, it is generally practiced to cut a socket recess into a socket driver for receiving a bolt head or extension socket post.

The overwhelming dominant industry-practice for manufacturing such drivers is to provide stock, cold-work the stock to a desired driver shape, and then heat-treat the driver. A first process for heat treatment is hardening including heating the drivers into the austenitic range and then quenching (either water spray or an oil bath) which results in a martensitic structure for the steel. Additional carbon may be added during this heating step, which is known as case-hardening. A second process in the heat treatment is a tempering stage including again heating the driver or tool to a temperature below the austenitic transformation temperature, holding the temperature at such level for approximately 2 hours, and then allowing the tool to cool slowly, such as with ambient air. Accordingly, the entire tool has a tempered martensite structure.

Like many metal implements, it is known that there are performance trade-offs when providing a heat treatment for such drivers. For instance, it is known that a high hardness for a steel product imparts high resistance to wear, yet also results in susceptibility to damage from impact or sudden load spikes, as such steel is brittle. In order to relieve or reduce the fragility of the tool, greater ductility may be imparted that results in the tool having a lower yield strength and, thus, being softer, more susceptible to wear, and more susceptible to plastic deformation. The heat treatment and materials performance characteristics resulting from the heat treatment for tools such as drivers are selected to balance these characteristics and tendencies.

Accordingly, there has been a need for an improved heat treatment for tools, particularly drivers and other elongated handtools.

SUMMARY

In accordance with an aspect, a method for heat treating a tool is disclosed including the steps of forming the tool with a working end for engaging a workpiece and with a non-working portion, directly applying a heat treatment to a first predetermined portion of the tool including at least a part of the non-working portion to impart a materials state to the first predetermined portion, and providing no direct heat treatment to a second predetermined portion of the tool including at least a part of the working end.

In some forms, the method further includes the step of providing a heating device, wherein the step of directly applying a heat treatment includes placing the first predetermined portion of the tool within the heating device, and wherein the step of providing no direct heat includes placing the second predetermined portion of the tool outside the heating device. The step of providing a heating device may include providing an induction coil.

In some forms, the step of forming the tool includes forming the tool of a steel alloy, and the step of directly applying a heat treatment includes a step of heating to a first temperature permitting transition to the austenitic materials state, a subsequent step of quenching, a further subsequent step of heating to a second temperature below the first temperature, and a third subsequent step of cooling. The third subsequent step of cooling may include quenching.

In some forms, the step of forming the tool includes the step of forming the tool from stock material having a predetermined materials state.

In some forms, the method further includes the step of permitting a heat treatment gradient between the at least part of the non-working portion and the at least part of the working end.

In some forms, the heat treatment gradient imparts a transition of materials states between the at least part of the non-working portion and the at least part of the working end.

In some forms, the method of claim 1 wherein the step of forming the tool includes the step of forming a socket driver.

In another aspect, a tool is disclosed including a stem portion directly heat treated to a hardened materials state, a working end not directly heat treated, and a transition between the stem portion and the working end having a heat treatment gradient.

In some forms, tool is formed of steel. The working end may have an annealed state. The working end may be hardened by cold-working.

In some forms, stem portion is generally elongated with a first diameter, the working end has a second larger diameter and includes a socket, and the transition varies in diameter between the stem portion and the working end.

In some forms, the stem portion is tempered martensite and at least a terminal portion of the working end is of a state having greater ductility than tempered martensite.

In some forms, the tool may be one of a wrench, a box wrench, a socket driver, a socket driver extension, a socket, a socket adapter, a ratcheting device, a reversible ratchet device, a screwdrivers, or pliers.

In another aspect, a method of forming a tool is disclosed including the steps of selecting desired materials performance characteristics for a working end of the tool, selecting a stock material having a state corresponding to the working end desired materials performance characteristics, selecting desired materials performance characteristics for a non-working portion of the tool, forming the tool from the stock material, the working end and non-working portion having the stock material state, after forming the tool, altering the state of at least a part of the non-working portion to a state having the selected desired materials performance characteristics therefor.

In some forms, the step of altering includes heat treating the at least part of the non-working portion.

In some forms, the step of altering includes directly applying a heat treatment to the non-working end while excepting the working end.

In some forms, the stock has a relatively ductile state, and the non-working portion state is relatively hard.

BRIEF DESCRIPTION OF THE DRAWINGS

In the Figures.

DETAILED DESCRIPTION

In forms of the present invention, a tool is provided with a differential heat treatment so that different portions of the tool are provided with different materials performance characteristics. In some forms, the tool is an elongated tool and/or a tool used for engaging workpieces such as a wrench or socket driver component. In a preferred form of the invention, a tool formed in a traditional manner is then subjected to heat treatment only on a non-working portion thereof. In other words, as heat treatment is used to select or alter the performance characteristics of a material, the heat treatment is non-uniform for the entire tool so that different portions of the tool benefit from different performance characteristics imparted by the differential heat treatment. As will be discussed herein, one form of such tool includes a working end that is in an annealed and then cold-worked state and a non-working portion that is heated and tempered, each followed by a quench, to impart hardness thereto.

Figure 1:
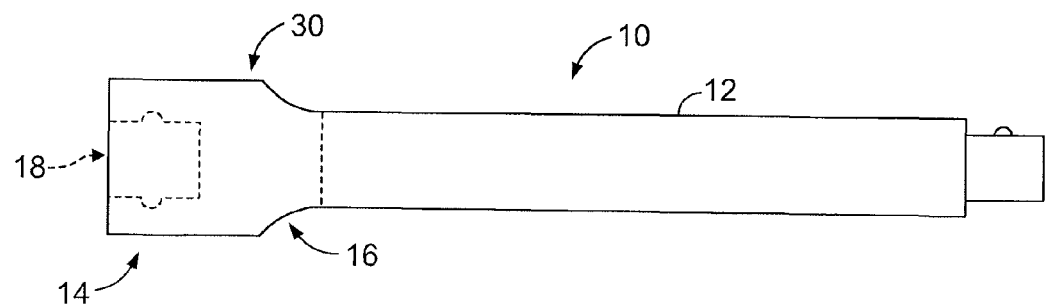
FIG. 1 is side elevational view of a form of a tool of the present invention.

Referring initially to FIG. 1, a representative tool 10 is depicted in the form of a socket extension. As is common for such a tool 10, an elongated handle or stem 12 is provided as a non-working portion and extends to an engaging or working end 14. As will be described in greater detail, the non-working stem 12 has a first set of materials performance characteristics and the working end 14 has a second and different set of materials performance characteristics. The first and second sets of materials performance characteristics are imparted by differences in manufacturing steps for the stem 12 and working end 14, and principally the differences are imparted by differences in heat treatment.

Generally speaking, the tool 10 may be initially formed to the depicted shape and structure in any manner. Stock is provided in the desired material, such as a particular grade of steel, and in a particular form, such as rod, bar, etc. The stock is generally provided in an annealed state so that the steel is relatively soft and ductile. The stock is then cold-worked to the desired shape. For the representative tool 10, such cold-working includes forming a radiused shoulder 16 at a junction between the working end 14 and the stem 12, and cutting or stamping or otherwise providing a recess in the form of a socket 18 in the working end 14. The socket 18 as shown is square for receiving a post (not shown) of a socket adapter (either an extension or a socket driver for engaging a workpiece), though the socket 18 itself may be constructed to directly engage a workpiece, as will be readily understood by one skilled in the art.

After formation to the desired shape, the tool 10 is heat treated in a manner more controlled than that of the prior art. While the standard practice is to heat treat the entire device in a uniform manner to provide uniform materials performance characteristics, the tool 10 of the present invention is heat treated to impart different materials performance characteristics to at least a part of the working end 14 and to at least a part of the stem 12. In a preferred form, heat treatment is only applied and directly applied to the stem 12, is not applied to the working end 14, and a transition region 30 spans over the intersection therebetween. To be clear, the working end 14 is excepted from the heat treatment, and the heat treatment is directly applied to the stem 12 and not the working end 14, though, as will be discussed, it is recognized that heat bleed is generally unavoidable. Therefore, the transition region 30 is a result of the unavoidable heat transfer from the stem 12, heated to an elevated temperature while the working end 14 is not, and the transition region 30 also helps avoid unpredictable and undesirable materials states that may result from an abrupt materials state junction between the working end 14 and the stem 12 that may occur from attempting to stifle such heat bleed.

In a preferred form, the stem 12 is first hardened and then tempered, the working end 14 generally receiving no heat treatment after formation of the tool 10. For the hardening, the stem 12 is induction heated by being positioned within and heated by a heating device such as an induction coil (not shown), as is known in the art. The stem 12 is heated to a temperature that permits the steel thereof to transition into the austenitic range, the temperature being dependent on the composition of the steel, as is known in the art. The tool 10 including the stem 12 is then quenched in a conventional manner such as with a water or oil bath.

To temper, the stem 12 is again heated to a temperature below that which permits transitioning to the austenitic range. This temperature is held for approximately two hours, and then the tool 10 including the stem 12 are again quenched. In a preferred form of the tool 10, the stem 12 is imparted with a relatively hard tempered martensitic materials state, while the working end 14 is imparted with a relatively ductile annealed state. More specifically, the stem 12 has a hardness of approximately 50 HRc while the working end 14 has a hardness of approximately 20 HRc, while the transition region 30 spanning the junction between the stem 12 and working end 14 has some gradient of hardness therebetween.

Figure 2:
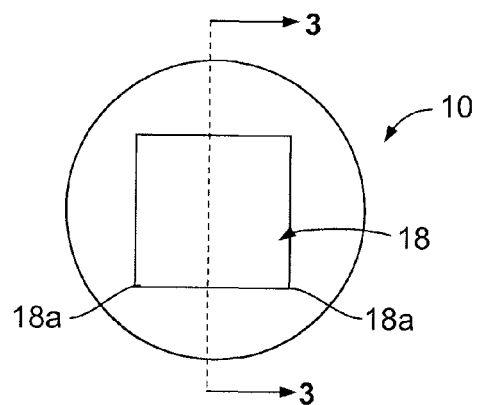
FIG. 2 is a front elevational view of the form of FIG. 1 including a socket.

As a result, the socket 18 of the working end 14 is provided with improved or optimized performance characteristics, as is the stem 12. To detail, the socket 18 concentrates stress due to torque or impact at corners 18*a*, shown in FIG. 2. Stress concentrators such as these corners 18*a* are principal sites of fracture or failure for tools. By providing the working end 14 including the socket 18 with a higher ductility and lower hardness, the corners 18*a* have a greater ability to withstand the stress, thereby resulting in a longer life for the tool 10. Additionally, the stem 12 is provided with materials characteristics that enable it to better withstand the applied torsional stresses and inadvertent impacts.

Figure 3:
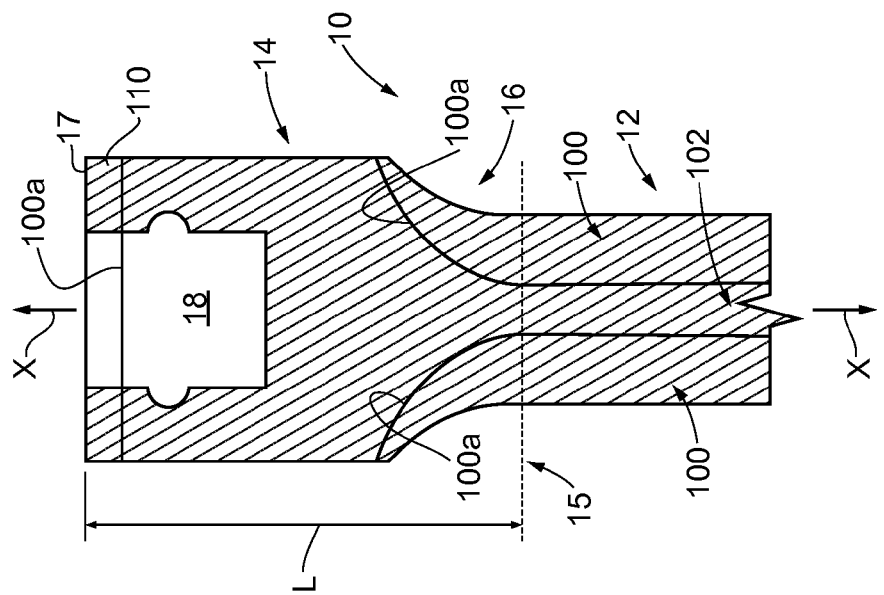
FIG. 3 is an enlarged view of the form of FIG. 1 showing a representative heat treatment.

Turning now to FIG. 3, a preferred from of the tool 10 is illustrated in detail and in cross-section. The tool 10 is generally cylindrical of varying circular dimension in cross-section. The stem 12 itself has a generally constant cross-section leading to the shoulder 16, and the working end 14 has a generally constant cross-sectional maximum diameter extending from the shoulder 16. From a junction 15 between the shoulder 16 and stem 12 to a distal terminus 17, the illustrated tool 10 has an axial length L of approximately 1.25 inches, the working end has a diameter of approximately 0.85," and the stem 12 has a diameter of approximately 0.5 inches.

As stated above, heat treatment is applied to the stem 12 and bleeds into the shoulder 16 and working end 14. In FIG. 3, the region of full heat treatment is represented as 100 and bounded by line 100*a*. It should be noted that the region 100 is a continuous region and portion of the tool 10 and is discussed herein as such, though the cross-sectional nature of FIG. 3 shows such as two regions 100. This region 100 extends towards the central axis X of the tool 10, preferably so that a central region 102 of the stem 12 that is not fully heat treated is less than 25 percent of the overall diametral size of the stem 12. From the junction 15, the region 100 extends towards the distal terminus 17 and through the shoulder 16 approximately 0.375." The central region 102 and the rest of the tool 10 (i.e., the working end 14 and shoulder 16) receive only heat bleed or far-field effects due to the heat treatment.

As shown in FIG. 3, the heat bleed and far field effects may extend though a substantial portion of the working end 14. For the illustrated form, the working end 14 may have a relatively small zero-treatment region 110 and bound between the terminus or terminal end 17 and line 110*a*, such as in the order of 0.2" and as little as 0.075" axial length from the distal terminus 17, that receives no far-field or transition effect due to heat bleed. Accordingly, while the heat treated region 100 may have a hardness of 50 HRc, as discussed above, and the zero-treatment region 110 may have a hardness in the range of 20 HRc, the balance of the working end 14 and the shoulder 16 forming the transition region 30 with a hardness gradient between the regions 100, 110. In the illustrated form, the full treatment region 100 extends into the working end 14 a slight amount, in the order of 0.1" and approximately 0.075."

Within the scope of the present invention is selecting the stock to provide a portion of the resulting tool 10, such as the working end 14, with desired performance characteristics. As stated above, in forms of the tool 10, the working end 14 receives no heat treatment. Accordingly, the materials performance characteristics are imparted by the materials state of the stock material and the formation steps such as cold-working applied to the stock material that serve to reduce the ductility. Therefore, the desired resulting materials state for the working end 14 can be accommodated by an appropriate selection of stock. For instance, stock material may be cold rolled, or hot rolled, etc., or the stock may otherwise be prepared prior to formation of a plurality of tools 10 therefrom.

Figure 4:
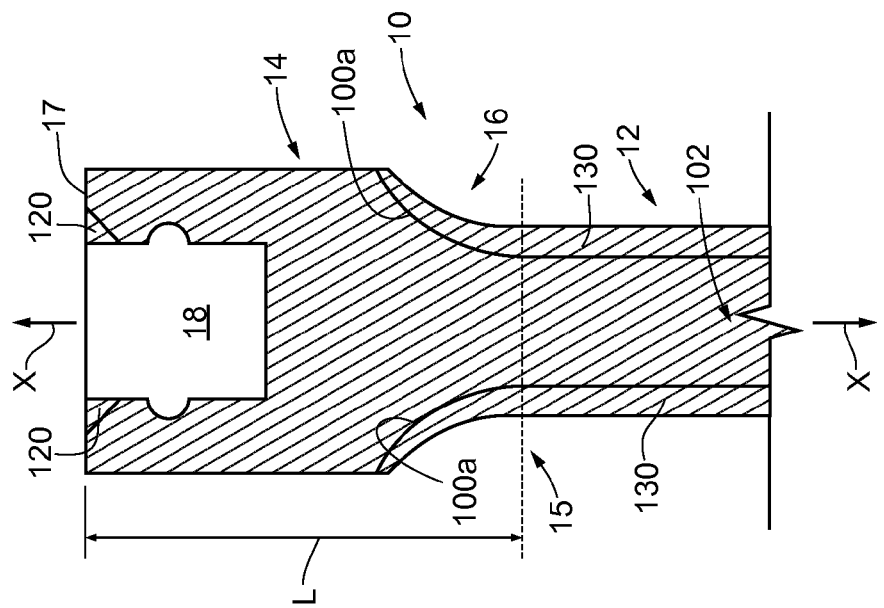
FIG. 4 is a second enlarged view of the form of FIG. 1 showing a second representative heat treatment.

As an additional example of heat treatment, FIG. 4 is provided. As can be seen, a working end 14 is depicted for the tool 10 with a zero-treatment region 120 that does not receive heat treatment. A number of the benefits of the heat-treatment, as described herein, is the retained ductility or softness for the portion of the working end 14 in direct cooperation with another component such as a post of a driver or a workpiece, as examples. Accordingly, the zero-treatment region 120 illustrated is representative of a minimal (though not necessarily the lowest minimum) amount of zero-treatment region 120.

In like manner, FIG. 4 also shows a full-treatment region 130 that is reduced in comparison to full-treatment region 100 of FIG. 3. The elongated stem 12 of the tool 10 preferably receives at least some heat treatment so that there is the depicted minimal (though, again, not necessarily lowest minimum) amount of full-treatment region 130. In a more preferred form, the full-treatment region 130 extends through the shoulder 16.

The tool 10, as described, may be a variety of known tools including wrenches including box wrenches, socket drivers, socket driver extensions, sockets or socket adapters, may be ratcheting devices including reversible ratchet devices, and may be screwdrivers or pliers, as should be clear. It should also be clear that the principals described herein may be applied to non-steel tools so that a working end is allowed to maintain a more ductile state while a materials state for a non-working portion is hardened by a differential heat treatment process to provide different materials characteristics. It should also be noted that the entire tool may be quenched after the tempering stage, thus accelerating the production time in comparison to the typical air-cool step.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A socket driver extension subjected to a heat treatment process, comprising:

a stem portion having a first end adapted to couple to a driver and receive an amount of torque from the driver, the stem portion is subject to the heat treatment process to a first depth measured in a radial direction from an external surface of the stem portion towards a center of the stem portion, wherein the first depth is comprised substantially of tempered martensite steel after the heat treatment process, and the first depth forms at least 75% of an overall diametric size of the stem portion;

a shoulder portion extending from the stem portion opposite the first end, wherein the shoulder portion is at least partially comprised of a material including tempered steel created by residual heat from the heat treatment process, and is substantially free of tempered martensite steel after the heat treatment process;

a working portion extending from the shoulder portion opposite the stem portion, wherein the working portion is comprised of a material including tempered steel formed as a result of residual heat from the heat treatment process, and is substantially free of tempered martensite steel after the heat treatment process and wherein the working portion includes a recess adapted to receive a device adapted to engage a work piece; and a zero-treatment region extending from the working portion to an end of the socket driver extension, wherein the zero-treatment region is comprised of a material free of tempered martensite steel and tempered steel and has a hardness of about 20 HRc, and forms only an opening of the recess.

2. The socket driver extension of claim 1, wherein at least one of the shoulder and working portions is hardened by a cold-working process.

3. The socket driver extension of claim 1, wherein the stem portion is generally elongated with a first diameter extending from the first end toward the shoulder portion, and the shoulder portion includes a second diameter larger than the first diameter.

4. The socket driver extension of claim 1, wherein at least a terminal portion of the shoulder portion has a ductility greater than a ductility of the tempered martensite steel.

5. The socket driver extension of claim 1, wherein the stem portion includes a second depth comprised of tempered steel created by residual heat of the heat treatment process and disposed internal of the first depth of the stem portion.

6. The socket driver extension of claim 1, wherein the zero- treatment zone extends diagonally from the end of the socket driver extension to the recess.

7. The socket driver extension of claim 1, wherein the zero- treatment zone extends radially around a central axis of the socket driver.

* * * * *